(12) United States Patent
Yoshikawa et al.

(10) Patent No.: US 6,778,485 B2
(45) Date of Patent: Aug. 17, 2004

(54) OPTICAL STORAGE DEVICE HAVING LIQUID CRYSTAL LAYERS VARYING LIGHT IN PHASE BETWEEN 0 AND $\pi$

(75) Inventors: Hiroyasu Yoshikawa, Kawasaki (JP); Shin-ya Hasegawa, Kawasaki (JP); Tatsuo Uchida, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/346,464

(22) Filed: Jan. 17, 2003

(65) Prior Publication Data

US 2003/0107978 A1 Jun. 12, 2003

Related U.S. Application Data

(62) Division of application No. 09/478,760, filed on Jan. 6, 2000.

(30) Foreign Application Priority Data

Feb. 24, 1999 (JP) ............................................. 11-046718

(51) Int. Cl.[7] ............................................. G11B 7/135
(52) U.S. Cl. ................................. 369/112.02; 369/44.23
(58) Field of Search .......................... 369/112.02, 44.23

(56) References Cited

U.S. PATENT DOCUMENTS

| | | | |
|---|---|---|---|
| 5,150,234 A | 9/1992 | Takahashi et al. |
| 5,416,757 A | 5/1995 | Luecke et al. |
| 5,589,955 A | 12/1996 | Amako et al. |
| 5,668,651 A | 9/1997 | Yamada et al. |
| 5,793,735 A | 8/1998 | Oono |
| 6,025,866 A | 2/2000 | Tsuchiya et al. |
| 6,078,554 A | 6/2000 | Ootaki et al. |
| 6,125,088 A | 9/2000 | Ogasawara er al. |
| 6,130,872 A | 10/2000 | Sugiura et al. |

FOREIGN PATENT DOCUMENTS

| | | |
|---|---|---|
| EP | 0 459 790 A2 | 12/1991 |
| JP | 5-205282 | 8/1993 |
| JP | 8-212611 | 8/1996 |
| JP | 9-35319 | 2/1997 |
| JP | 9-306013 | 11/1997 |
| JP | 10-020263 | 1/1998 |
| JP | 10-247330 | 9/1998 |
| JP | 10-302302 | 11/1998 |
| JP | 10-319318 | 12/1998 |

OTHER PUBLICATIONS

"Kinoform Using an Electrically Controlled Birefringent Liquid–Crystal Spatial Light Modulator"; Jun Amako et al.; *Applied Optics*; vol. 30, No. 32; pp. 4611–4628; Nov. 10, 1991.

*Primary Examiner*—Gautam R. Patel
(74) *Attorney, Agent, or Firm*—Greer, Burns & Crain, Ltd.

(57) ABSTRACT

There are disclosed an optical storage device for accessing an optical recording medium such as a phase change type of optical disk and an optical magnetic disk, and a liquid crystal device preferably applicable to such a optical storage device. The liquid crystal device has a structure that two liquid crystal layers, each of which has stripe-like shaped electrodes arranged in a direction perpendicularly intersecting one another, are superposed. This structure makes it possible to effectively correct an aberration caused by a change in a depth from a surface of an optical recording medium to a condensing point, for example, in cases of unevenness in thickness of a protective layer and a multi-layer recording.

5 Claims, 14 Drawing Sheets

SUBSTRATE SURFACE
(X direction)

SUBSTRATE SURFACE
(Y direction)

OPTICAL STORAGE DEVICE HAVING LIQUID CRYSTAL LAYERS VARYING LIGHT IN PHASE BETWEEN 0 AND π

This is a divisional, of application Ser. No. 09/478,760, filed Jan. 6, 2000.

BACKGROUND OF THE INVENTION

1. Field of the Invention

The present invention relates to an optical storage device for accessing an optical recording medium such as a phase change type of optical disk and an optical magnetic disk, and a liquid crystal device preferably applicable to such a optical storage device.

2. Description of the Related Art

An optical disk, such as a phase change type (PD) of optical disk and an optical magnetic disk (MO), is a portable recording medium having a high storage capacity, and is being considered as a preferred recording medium of a personal computer. A possibility of obtaining a higher density and larger capacity for such an optical disk is being pursued.

To implement a larger capacity of an optical disk while a recording area of the optical disk is maintained as it is, there is a need to increase a recording density of the recording area or to establish a multi-layer construction of recording. In order to increase a recording density of the recording area, there is basically a need to reduce a condensing spot of a laser beam to be used, while there is considered means such as a magnetic resolution.

Generally, a diameter of a spot of a laser beam is in proportion to $\lambda/NA$ ($\lambda$:wavelength of light, NA: numerical aperture).

Therefore, to implement a higher density of recording for an optical disk, there is a need to use a laser (for example, a laser emitting light of blue) which is short in wavelength, or increase NA of an objective lens.

However, in the event that NA of an objective lens is increased, it involves a problem of a spherical aberration due to an unevenness in thickness of transparent protective layers on a surface of an optical disk when the optical disk is manufactured.

Particularly, since the optical disk is constructed as a storage medium which is detachably loaded, there is needed a transparent protective layer on a layer which is essentially necessary for a storage and a pick-up of information, such as a reflecting layer and a recording layer. The unevenness in thickness of the protective layer on the manufacture is of ±50 μm or so as an unevenness on an individual optical disk (an unevenness as an individual difference) and is of ±10 μm or so as a variation inside the same optical disk (an unevenness inside an individual). The unevenness in thickness of transparent protective layers on a surface of an optical disk causes a spherical aberration on light condensed on the recording layer, and this spherical aberration has a bad effect on recording and reading of a pit mark.

FIG. 1 is a diagram showing a spherical aberration RMS to an unevenness of a protective layer.

FIG. 1 shows results of calculations in case of NA=0.6 corresponding to the present DVD, and in case of NA=0.85. In a case where an unevenness in thickness of the protective layer on the manufacture is of ±50 μm, if NA=0.6, it is within an aberration allowance. On the other hand, if NA=0.85, an aberration, which cannot be covered, occurs. Therefore, to implement a high NA of objective lens there is needed a mechanism for correcting the spherical aberration in accordance with an unevenness in thickness of the protective layer.

In order to satisfy such a requirement, there is proposed a scheme in which two objective lenses are used so that a spherical aberration is actively corrected by mechanically altering an interval between the two objective lenses (cf. Japanese Patent Laid Open Gazette Hei. 8-212579).

However, according to this proposal, a further mechanical driving for the objective lens is added. Thus, this is associated with a problem that a weight of a head portion of a pick-up is increased and a larger space is needed.

On the other hand, there is proposed a scheme in which a liquid crystal device is disposed in an optical path so as to correct an aberration (cf. for example, Japanese Patent Laid Open Gazette Hei. 8-212611, Japanese Patent Laid Open Gazette Hei. 9-128785).

As such a liquid crystal device, there are two known two types of an electrode structure of two dimensional matrix configuration and an electrode structure patterned after a pattern associated with the aberration.

To implement a matrix configuration of electrode, there is a need to use a TFT. The TFT matrix panel needs a very complicated manufacturing process, and thus this is associated with such a problem that it is obliged to increase greatly the cost.

On the other hand, with respect to the electrode structure patterned, it is associated with a problem that a phase distribution of light, which is formed by a distribution of index of refraction of the liquid crystal device, is fixed. Thus, there is a need to dispose the liquid crystal device as to an optical axis with great accuracy. This involves such a problem that a strict precision of an alignment is required. In order to correct a spherical aberration through a patterned electrode structure, an electrode structure having a concentric circle of pattern is adopted. However, to correct the spherical aberration with greater accuracy, if the concentric circle of pattern is given with greater definition, this causes a polarization of the baser beam to be disturbed. Thus, this is not suitable for correction of the spherical aberration when the objective lens of a high NA is adopted. Further, in the event that the concentric circle of pattern is given with greater definition, this causes the number of lead wires derived from a ring electrode inside the concentric circle to be increased, and thereby increasing a wiring area for the lead wires. This is associated with a problem on manufacture that the concentric circle of pattern cannot be formed per se.

Further, Japanese Patent Laid Open Gazette Hei. 9-128785 discloses the use of a strip shaped electrode. However, the use of a strip shaped electrode cannot almost correct the aberration from a view point of an aberration correction at the time of a high NA.

In the above description, the necessity for the aberration correction is explained in association with an unevenness in thickness of the protective layer of the optical disk. On the other hand, also when it is intended that an optical storage medium having a multi-layer construction of recording, that is, a plurality of information recording layers in a depth direction, is implemented, there is a need to actively correct the aberration due to the variation in depth.

While the above explanation is made in connection with the optical disk, the above-mentioned problems are applied to, for example, a tape-like shaped optical storage medium too, regardless of the disk configuration.

SUMMARY OF THE INVENTION

In view of the foregoing, it is an object of the present invention to provide an optical storage device capable of effectively correcting an aberration caused by a variation in a depth from a surface of an optical storage medium to a condensing point, even if the depth is varied, for example, in cases of an unevenness in thickness of a protective layer and the multi-layer recording, and a liquid crystal device capable of being preferably adopted to the optical storage device for a use of the aberration correction.

To achieve the above-mentioned objects, the present invention provides an optical storage device comprising:

a light source;

an irradiation optical system for leading light emitted from said light source to condense on a predetermined optical storage medium;

a photo detector for picking up a signal light carrying information stored in said optical storage medium to read the information, said signal light being condensed onto said optical storage medium and reflected on said optical storage medium;

a pick-up optical system for leading said signal light to said photo detector;

a liquid crystal device having first and second liquid crystal layers disposed in mid way of an optical path of said irradiation optical system and extending in parallel with a direction intersecting said optical path, a plurality of first electrodes for driving said first liquid crystal layer, said plurality of first electrodes extending a predetermined x-direction intersecting said optical path and arranged in a y-direction intersecting both said optical path and said x-direction, and a plurality of second electrodes for driving said second liquid crystal layer, said plurality of second electrodes extending the y-direction and arranged in the x-direction; and a liquid crystal driver for applying controlled voltages to said plurality of first electrodes and said plurality of second electrodes of said liquid crystal device to correct an aberration of light to he condensed on said optical storage medium.

An important inventive feature of an optical storage device of the present invention resides in the point that the optical storage device adopts a liquid crystal device having a structure that two liquid crystal layers, each of which has stripe-like shaped electrodes, arranged in a direction perpendicularly intersecting one another, are superposed. This feature makes drawing of lead wires from the electrodes easy and also makes it possible to facilitate a fabrication of the device. Further, according to the optical storage device of the present invention, it is possible to correct the aberration in accordance with an electric control and thereby permitting a very rough alignment. Furthermore, according to the optical storage device of the present invention, as will be described later in connection with the preferred embodiments, the optical storage device has a sufficient aberration correction ability.

In the optical storage device according to the present invention as mentioned above, it is acceptable that said irradiation optical system has an objective lens at a place adjacent to said optical storage medium, said objective lens comprising a plano-convex lens and an aspherical lens.

This feature makes it possible to easily implement a high NA of objective lens, and thus according to the optical storage device of the present invention, it is possible to give a sufficient aberration correction ability, even if a high NA of objective lens is used.

In the optical storage device according to the present invention as mentioned above, it is preferable that said liquid crystal driver applies voltages to said plurality of first electrodes and said plurality of second electrodes of said liquid crystal device, said voltages being controlled in such a manner that a phase distribution of light passing through said first liquid crystal layer in the y-direction is of a Kinoform structure and a phase distribution of light passing through said second liquid crystal layer in the x-direction is of a Kinoform structure.

This feature makes it possible to constitute the liquid crystal device with thin liquid crystal layers, and thereby contributing to higher operational speed of the liquid crystal device.

Further, in the optical storage device according to the present invention as mentioned above, it is preferable that said first and second liquid crystal layers of said liquid crystal driver are determined in their properties in such a manner that a normal of an altering surface of a liquid crystal molecular alignment in said first liquid crystal layer, due to a change in an electric field within said first liquid crystal layer according to changes of voltages applied to said first electrodes, and a normal of an altering surface of a liquid crystal molecular alignment in said second liquid crystal layer, due to a change in an electric field within said second liquid crystal layer according to changes of voltages applied to said second electrodes, are directed to a same direction.

Such a determination of properties of the first and second liquid crystal layers prevents a polarization state of the incident light from being changed by the liquid crystal itself.

Alternatively, in the optical storage device according to the present invention as mentioned above, it is preferable that said first and second liquid crystal layers of said liquid crystal driver are determined in their properties in such a manner that a normal of an altering surface of a liquid crystal molecular alignment in the first liquid crystal layer, due to a change in an electric field within said first liquid crystal layer according to changes of voltages applied to said first electrodes, and a normal of an altering surface of a liquid crystal molecular alignment in said second liquid crystal layer, due to a change in an electric field within said second liquid crystal layer according to changes of voltages applied to said second electrodes, establish a predetermined angle (e.g. 90°), and a wavelength plate (e.g. $\lambda/2$ plate) for rotating a polarization direction of an incident light by the predetermined angle is disposed between the first liquid crystal layer and the second liquid crystal layer.

This arrangement also prevents a polarization state of the incident light from being changed by the liquid crystal itself.

Further, in the optical storage device according to the present invention as mentioned above, it is preferable that properties in alignment of liquid crystal molecules of said first and second liquid crystal layers of said liquid crystal device are of bend.

In a manufacturing process of a liquid crystal device, a property in alignment of liquid crystal molecules of liquid crystal layers of the liquid crystal device is selectable between a bend and a splay in accordance with a direction for rubbing (mechanically) a substrate for supporting the liquid crystal layer. A selection of the bend contributes to a higher speed in change of alignment of liquid crystal molecules of the liquid crystal layer, that is, a higher operational speed of the liquid crystal device.

Furthermore, in the optical storage device according to the present invention as mentioned above, it is preferable that said irradiation optical system is an optical system which permits light beams emitted from said light source to pass through said liquid crystal device by one time while the light beams are condensed on said optical storage medium, and said first and second liquid crystal layers of said liquid crystal device are set up in their thickness such that phases of light emitted from said light source and passing through said first and second liquid crystal layers vary between 0 and 2π under control of voltages applied to said first electrodes and said second electrodes, respectively.

A provision of a thickness of a liquid crystal layer, which permits a phase of a light to vary between 0 and 2π, makes it possible to correct an aberration adopting a phase change of the above-mentioned Kinoform structure, and also contributes to a higher speed in change of alignment of liquid crystal molecules of the liquid crystal layer.

Still further, in the optical storage device according to the present invention as mentioned above, it is preferable that said irradiation optical system is an optical system which permits light beams emitted from said light source to pass through said liquid crystal device on a reciprocation basis while the light beams are condensed on said optical storage medium, and said first and second liquid crystal layers of said liquid crystal device are set up in their thickness such that phases of light emitted from said light source and passing through said first and second liquid crystal layers by one time vary between 0 and π under control of voltages applied to said first electrodes and said second electrodes, respectively.

In this case, the thickness of the liquid crystal layers becomes further half, thereby implementing a higher speed operation.

Still further, in the optical storage device according to the present invention as mentioned above, it is preferable that said liquid crystal device has a reflecting surface for reflecting a light incident onto said liquid crystal device and passing through both said first and second liquid crystal layers and for causing the light to pass through both said first and second liquid crystal layers again.

In the event that the liquid crystal device is used on a reciprocation basis, a provision of the above-mentioned reflecting surface on the liquid crystal device may avoid a necessity for preparing an additional reflecting mirror or the like. Thus, it is possible to contribute to miniaturization and low cost.

Still further, in the optical storage device according to the present invention as mentioned above, it is preferable that a width of each of said first electrodes of said liquid crystal device in connection with the y-direction has a size not less than a thickness of said first liquid crystal layer, and a width of each of said second electrodes of said liquid crystal device in connection with the x-direction has a size not less than a thickness of said second liquid crystal layer.

In the event that a width of an electrode is narrower than a thickness of a liquid crystal layer, an electric field, which is formed in the liquid crystal layer by a voltage applied to the electrode, extends within the liquid crystal layer. As a result, there is a possibility that an electric field distribution formed within the liquid crystal layer is greatly different from an ideal electric field distribution and thus it is difficult to expect a sufficient aberration correction. On the other hand, a formation of an electrode having a width larger than the thickness of the liquid crystal layer, as mentioned above, makes it possible to form a suitable electric field distribution within the liquid crystal layer.

Still further, in the optical storage device according to the present invention as mentioned above, it is acceptable that a part of said irradiation optical system is shared with a part of said pick-up optical system, said liquid crystal device is disposed at a portion for common use of said irradiation optical system and said pick-up optical system, light beams emitted from said light source are condensed via said liquid crystal device onto said optical storage medium, and the signal light carrying information stored in said optical storage medium, which is condensed onto said optical storage medium and reflected on said optical storage medium, is led via said liquid crystal device to said photo detector. Or alternatively it is acceptable that a part of said irradiation optical system is shared with a part of said pick-up optical system, said liquid crystal device is disposed at a portion other than a portion for common use of said irradiation optical system and said pick-up optical system, light beams emitted from said light source are condensed via said liquid crystal device onto said optical storage medium, and the signal light carrying information stored in said optical storage medium, which is condensed onto said optical storage medium and reflected on said optical storage medium, is led via an optical path, which is different from an optical path passing through said liquid crystal device, to said photo detector.

What needs an aberration correction is mainly an irradiation optical system side, either of the structures as mentioned above is acceptable.

Still further, in the optical storage device according to the present invention as mentioned above, it is preferable that said irradiation optical system has a beam splitter for splitting a light or determining a travelling direction of a light, and said liquid crystal device and said beam splitter are formed in a unitary body.

In the event that the irradiation optical system has a beam splitter, when the liquid crystal device and the beam splitter are formed in a unitary body, it is possible to reduce the number of parts and contribute to effective assembling and miniaturization of the device.

While the above explanation is concerned, such a matter that the pick-up optical system of the optical storage device leads light reflected on the optical storage medium to the photo detector, it is acceptable to provide such an arrangement that a transparent type of optical storage medium is prepared, and the pick-up optical system of the optical storage device leads light passing through the optical storage medium to the photo detector.

In this case, there is provided an optical storage device comprising:

a light source;

an irradiation optical system for leading light emitted from said light source to condense on a predetermined optical storage medium;

a photo detector for picking up a signal light carrying information stored in said optical storage medium to read the information, said signal light being condensed onto said optical storage medium and passing through said optical storage medium;

a pick-up optical system for leading said signal light to said photo detector;

a liquid crystal device having first and second liquid crystal layers disposed in mid way of an optical path of said irradiation optical system and extending in parallel with a direction intersecting said optical path, a plurality of first electrodes for driving said first liquid crystal layer, said plurality of first electrodes extending a predetermined x-direction intersecting said optical path and arranged in a y-direction intersecting both said optical path and said x-direction, and a plurality of second electrodes for driving said second liquid crystal layer, said plurality of second electrodes extending the y-direction and arranged in the x-direction; and a liquid crystal driver for applying controlled voltages to said plurality of first electrodes and said plurality of second electrodes of said liquid crystal device to correct an aberration of light to be condensed on said optical storage medium.

In the optical storage device according to the present invention as mentioned above, it is acceptable that said optical storage medium has a plurality of information storage points in a depth direction, said liquid crystal driver applies voltages, which are controlled in accordance with condensing points in the depth direction of said optical storage medium, to the plurality of first electrodes and the plurality of second electrodes of said liquid crystal device, respectively, so that an aberration correction according to the condensing points in the depth direction of said optical storage medium is performed, said optical storage device further comprising:

a second liquid crystal device having third and fourth liquid crystal layers disposed in mid way of an optical path of said pick-up optical system and extending in parallel with a direction intersecting said optical path, a plurality of third electrodes for driving said third liquid crystal layer, said plurality of third electrodes extending a predetermined x'-direction intersecting said optical path and arranged in a y'-direction intersecting both said optical path and said x' direction, and a plurality of fourth electrodes for driving said fourth liquid crystal layer, said plurality of fourth electrodes extending the y'-direction and arranged in the x'-direction; and a second liquid crystal driver for applying voltages, which are controlled in accordance with the condensing points in the depth direction of said optical storage medium, to said plurality of third electrodes and said plurality of fourth electrodes of said second liquid crystal device to perform an aberration correction according to the condensing points in the depth direction of said optical storage medium.

The present invention is also applicable to a multi-layer recording scheme of optical storage medium, that is, an optical storage medium having a plurality of information storage points in a depth direction.

Further, an optical storage device according to the present invention, it is possible to arrange it as an information writing dedicated-device to an optical storage medium.

In this case, there is provided an optical storage device comprising:

a light source;

an irradiation optical system for leading light emitted from said light source to condense on a predetermined optical storage medium;

a liquid crystal device having first and second liquid crystal layers disposed in mid way of an optical path of said irradiation optical system and extending in parallel with a direction intersecting said optical path, a plurality of first electrodes for driving said first liquid crystal layer, said plurality of first electrodes extending a predetermined x-direction intersecting said optical path and arranged in a y-direction intersecting both said optical path and said x-direction, and a plurality of second electrodes for driving said second liquid crystal layer, said plurality of second electrodes extending the y-direction and arranged in the x-direction; and a liquid crystal driver for applying controlled voltages to said plurality of first electrodes and said plurality of second electrodes of said liquid crystal device to correct an aberration of light to be condensed on said optical storage medium.

In the optical storage device according to the present invention as mentioned above, it is acceptable that said optical storage medium has a plurality of information storage points in a depth direction, and said liquid crystal driver applies voltages, which are controlled in accordance with condensing points in the depth direction of said optical storage medium, to the plurality of first electrodes and the plurality of second electrodes of said liquid crystal device, respectively, so that an aberration correction according to the condensing points in the depth direction of said optical storage medium is performed.

To achieve the above-mentioned objects, the present invention provides a liquid crystal device comprising:

first and second liquid crystal layers extending in a state that they are opposite to one another in parallel with a predetermined plane extending in an x-direction and a y-direction which intersect each other;

a plurality of first electrodes for driving said first liquid crystal layer, said plurality of first electrodes extending the x-direction and arranged in the y-direction; and a plurality of second electrodes for driving said second liquid crystal layer, said plurality of second electrodes extending the y-direction and arranged in the x-direction.

DETAILED DESCRIPTION OF PREFERRED EMBODIMENTS

Figure 1:
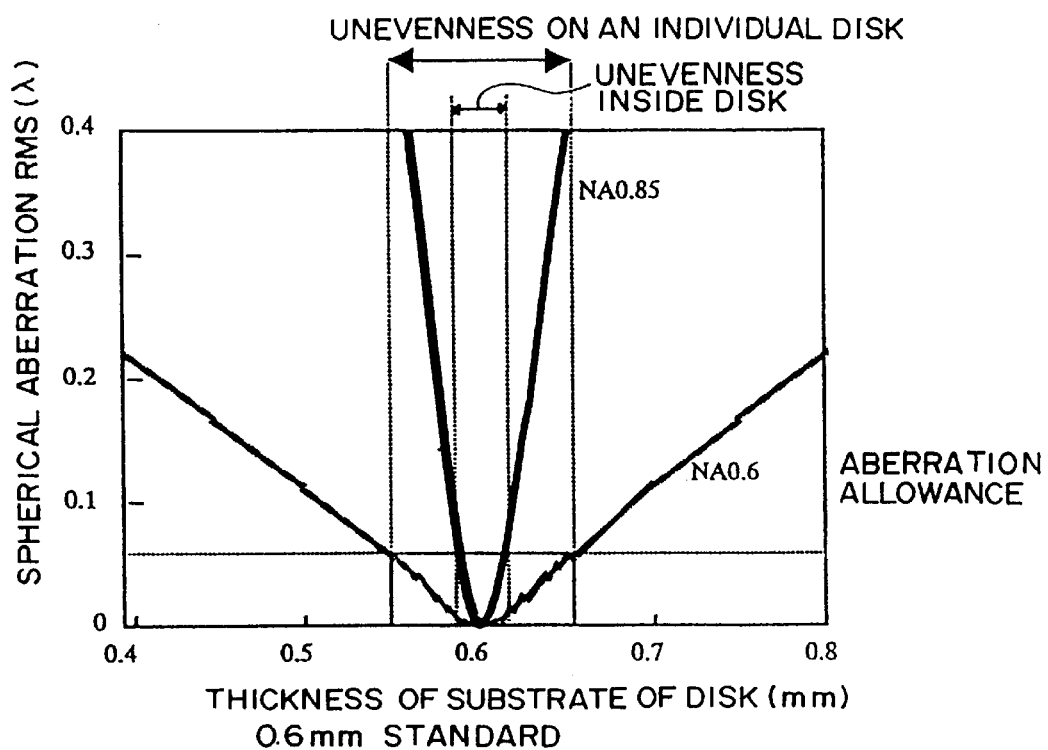
FIG. 1 is a diagram showing a spherical aberration RMS to an unevenness of a protective layer.

Hereinafter, first, there will be described a theory as to a matter that according to a liquid crystal device, it is possible to effectively correct an aberration caused by a variation in depth from a surface of an optical storage medium to a condensing point inside the optical storage medium, and then there will be described embodiments of the present invention.

Incidentally, according to the following theoretical explanation, it is assumed that the condensing point is varied in depth owing to a variation in thickness of a protective layer of a surface of an optical disk.

A defocus aberration, which is owing to a shift of a focal point in an optical axis direction, is caused by a simple variation of a reference spherical surface. Thus, it is possible to distinguish the defocus aberration from other aberration. In the conventional optical system of a low NA, it is acceptable that the defocus aberration is in proportion to $(NA)^2$. However, in case of a high NA (here NA=0.85 is considered), there is a need to consider a high degree not less than 8 degree. Generally, a disturbance near the focal point is expressed by the following equation:

$$u(x, y) = \int\int_{\xi^2+\eta^2 \leq NA^2} \exp[-ik(\xi x + \eta y + \sqrt{1-\xi^2-\eta^2} z)] d\xi d\eta \quad (1)$$

where (x, y) denotes coordinates, ($\xi$, $\eta$) denotes coordinates on an aperture in a front side focal plane, and k denotes wave number:

At that time, $$\exp[-ik(\sqrt{1-\xi^2-\eta^2} z)]$$

is regarded as a wave distortion in a case where an image surface is shifted from a focal plane by a distance z. When $\xi^2+\eta^2=NA^2$ is expressed and the shift of the distance is replaced by dz, the defocus aberration dWdefocus is expressed by the following expression:

$$dWdefocus = dz(\sqrt{1-NA^2} - 1) \quad (1)$$

$$= \left(\frac{1}{2}\right)dz(NA)^2 \cdot r^2 + \left(\frac{1}{8}\right)dz(NA)^4 \cdot r^4 + \left(\frac{1}{16}\right)dz(NA)^6 \cdot r^6 +$$

-continued $$\left(\frac{5}{128}\right)dz(NA)^8 \cdot r^8 + \left(\frac{7}{256}\right)dz(NA)^{10} \cdot r^{10}$$

On the other hand, a spherical aberration due to a variation in thickness of a protective layer of an optical disk is obtained in the following manner.

A movement Lz of a luminous flux of an emitting angle from a paraxial focal point position when it passes through a disk substrate, due to disk thickness error $\Delta t$ is expressed by:

$$Lz = \frac{d}{n}\left(1 - \frac{n\cos\theta}{\sqrt{n^2-\sin^2\theta}}\right),$$

where, n is a refractive index of the substrate. In the event that sin $\theta$ is developed up to 8 degree of item, and a lateral aberration of a ray of light is determined and is converted to a wave aberration, a spherical aberration dWdisk due to a variation in thickness of a disk substrate, taking a high degree item, is expressed by an equation (2):

$$dWdisk = \frac{1}{4}\left(\frac{-1}{2n^3} + \frac{1}{2n}\right)dt \cdot NA^4 \cdot r^4 + \frac{1}{6}\left(\frac{-3}{8n^5} + \frac{1}{4n^3} + \frac{1}{8n}\right)dt \cdot \quad (2)$$

$$NA^6 \cdot r^6 + \frac{1}{8}\left(\frac{-5}{16n^7} + \frac{3}{16n^5} + \frac{1}{16n^3} + \frac{1}{16n}\right)dt \cdot (NA)^8 \cdot r^8 +$$

$$\frac{1}{10}\left(\frac{-35}{128n^9} + \frac{5}{32n^7} + \frac{3}{64n^5} + \frac{1}{32n^3} + \frac{5}{128n}\right)dt \cdot (NA)^{10} \cdot r^{10}$$

where dt denotes a variation in thickness of a protective layer of the disk substrate.

When a phase distribution, which is intended to be produced by a liquid crystal, is represented by a phase transfer function, it is given by even functions on x and y, and thus generally, they are expressed by following equations (3) and (4):

$$\phi(x) = c_1 \cdot x^2 + c_2 \cdot x^4 + c_3 \cdot x^6 + c_4 \cdot x^8 + c_5 \cdot x^{10} \quad (3)$$

$$\phi(y) = c_1 \cdot y^2 + c_2 \cdot y^4 + c_3 \cdot y^6 + c_4 \cdot y^8 + c_5 \cdot y^{10} \quad (4)$$

To correct a spherical aberration caused by a variation in thickness of a protective layer of an optical disk with respect to an x-direction and a y-direction independently, the aberration is cancelled in accordance with equations (3) and (4), while generated aberrations on equation (2) are regulated in accordance with equation (1). However, it is difficult to completely suppress the aberration to be zero, and the residual aberration remains. If the residual aberration is expressed by dW, the following expression consists:

$$dW = dWdisk + dWdefocus - \phi(x) - \phi(y)$$

$$(r = \sqrt{(x^2+y^2)})$$

it is satisfactory that the residual aberration dW is sufficiently small as compared with dWrms of an RMS value of a liquid aberration. A relation between the dWrms of the RMS value and the aberration dW is given as follows:

$$(dWrms)^2 = \frac{\int_0^1 \int_0^{2\pi} (dW - \overline{dW})^2 \rho d\rho d\theta}{\int_0^1 \int_0^{2\pi} \rho d\rho d\theta} = \overline{dW^2} - (\overline{dW})^2$$

$\eta$, $\theta$ are parameters wherein positions in the associated apertures are represented by polar coordinates, respectively. A relation between a variation dt in thickness of a protective layer of an optical disk in dWdisk and a variation dz in free space distance in dWdefocus is expressed by dz=K·dt where k is a coefficient. The residual aberration can be determined by means of applying a least square fitting, wherein parameters K, $c_1 \sim c_5$ are established, and an evaluation function is given in the form of an RMS value of an aberration.

Figure 2:
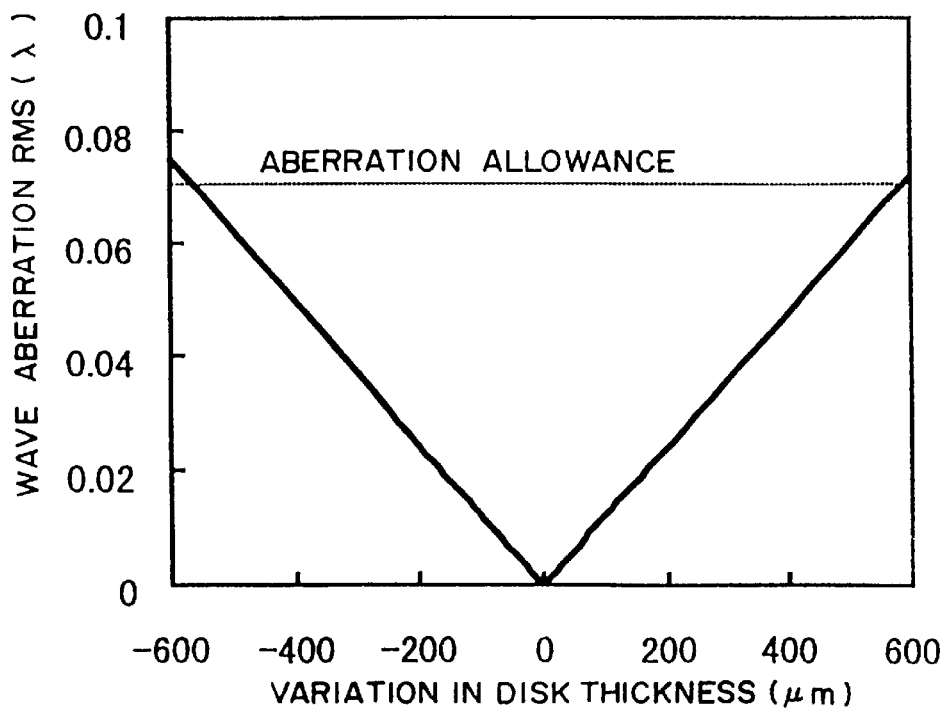
FIG. 2 is a graph showing a residual wave aberration (the axis of ordinate) to a variation (the axis of abscissas) in thickness of a protective layer of an optical disk.

FIG. 2 is a graph showing a residual wave aberration (the axis of ordinate) to a variation (the axis of abscissas) in thickness of a protective layer of an optical disk, determined in accordance with a manner as mentioned above. The used wavelength $\lambda$ is 685 nm.

From this result, it would be understood that the use of a scheme of independent correction with respect to the x-direction and the y-direction makes it possible in principle to keep the spherical aberration within an allowance limit, even if a thickness of a protective layer of an optical disk is varied ±600 $\mu$m.

Figure 3:
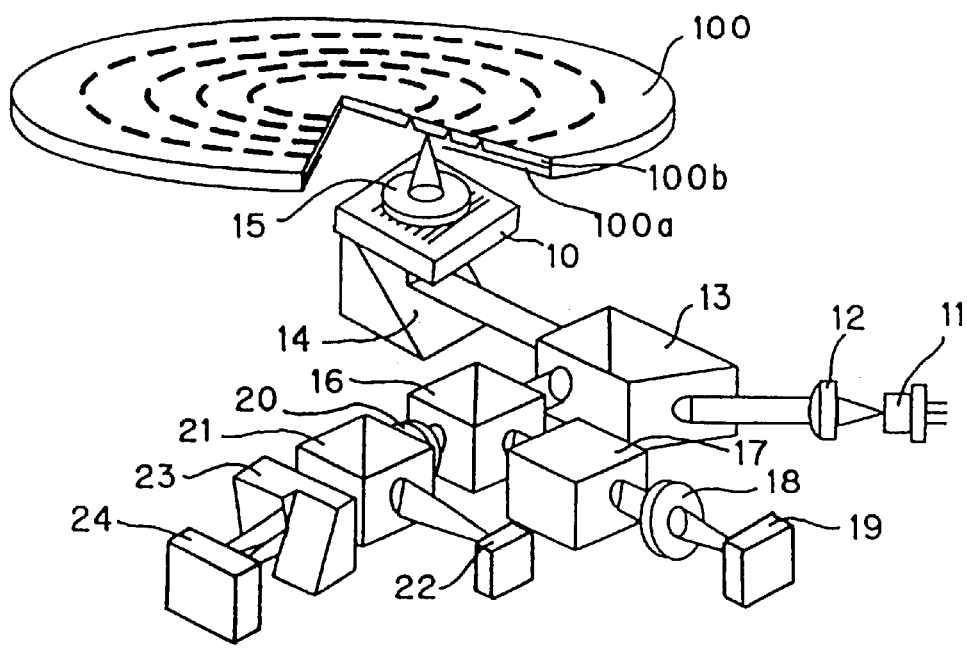
FIG. 3 is a schematic construction view of an optical storage device according to the first embodiment of the present invention.

FIG. 3 is a schematic construction view of an optical storage device according to the first embodiment of the present invention.

A laser beam emitted from a semiconductor laser 11 passes through a condenser lens 12 and a polarization beam splitter 13, and reflects on a reflecting mirror 14, and further passes through a liquid crystal device 10 and an objective lens 15, and goes toward an optical disk 100. The optical disk 100 has a transparent protective layer 100a on a surface thereof. Light beams emitted from the objective lens 15 are condensed on a point on a recording layer 100b placed below the protective layer 100a. The unevenness in thickness of the protective layer 100a on the manufacture is of the maximum ±50 $\mu$m or so as an unevenness on the individual optical disk 100. A spherical aberration of light beams condensed on the recording layer 100b, which are owing to the unevenness in thickness of the protective layer 100a, are corrected by the liquid crystal device 10.

A signal light reflected on the recording layer 100b of the optical disk 100, which carries information recorded on the optical disk 100, passes through the objective lens 15 and the liquid crystal device 10, reflects on the reflecting mirror 14, enters the polarization beam splitter 13, and goes to a beam splitter 16 side. An incident light to the beam splitter 16 is divided into two parts one of which enters Wollaston prism 17 whereby the light is separated in accordance with the polarization direction. And the light thus separated enters via a lens 18 a photo detector 19 for picking up information recorded on the optical disk 100.

On the other hand, another of the two parts of light divided by the beam splitter 16 enters via a lens 20 a beam splitter 21 wherein the light is further divided into two parts one of which enters a photo detector 22 for a tracking error detection, and another enters a wedge prism 23 wherein a light beam is further divided into two parts and is projected onto a photo detector 24 for a focus error detection. The tracking error detection, the focus error detection, and the optical system but the liquid crystal device 10 are of a well known technique per se, and thus a redundant description will be omitted.

Figure 4:
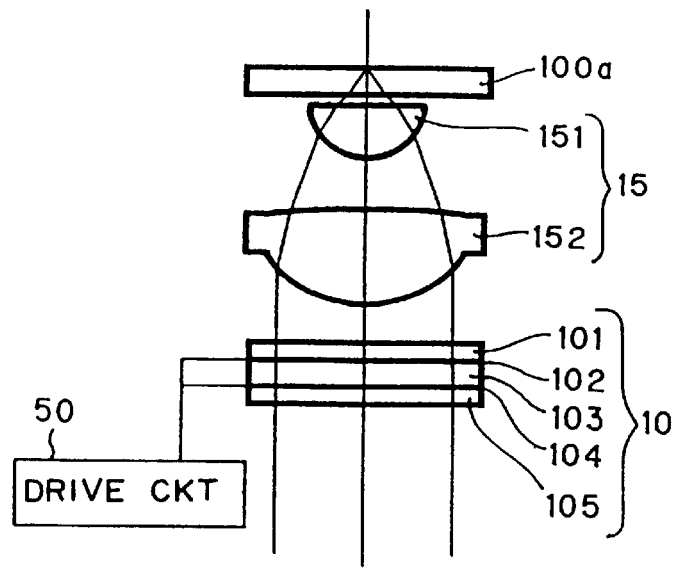
FIG. 4 is a sectional view showing portions of a liquid crystal device and an objective lens in the optical storage device shown in FIG. 3.
Figure 5:
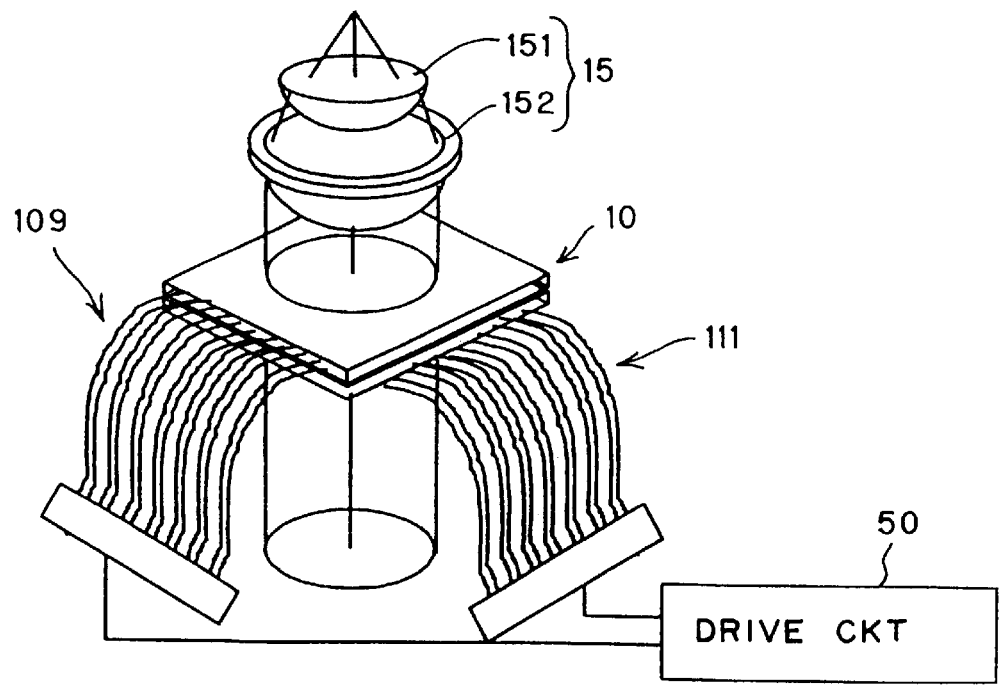
FIG. 5 is a perspective view showing portions of a liquid crystal device and an objective lens in the optical storage device shown in FIG. 3.
Figure 6:
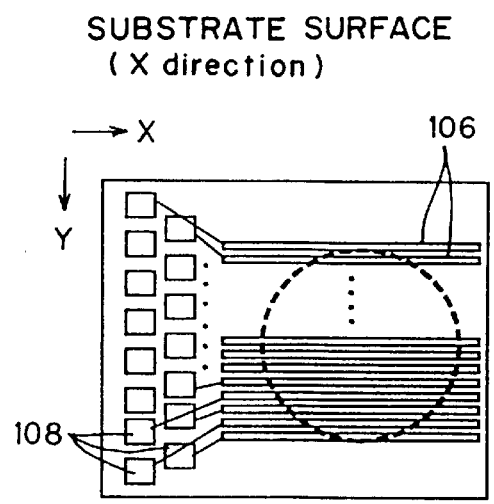
FIGS. 6(A) and 6(B) are views showing electrode structures of a liquid crystal device.
Figure 6:
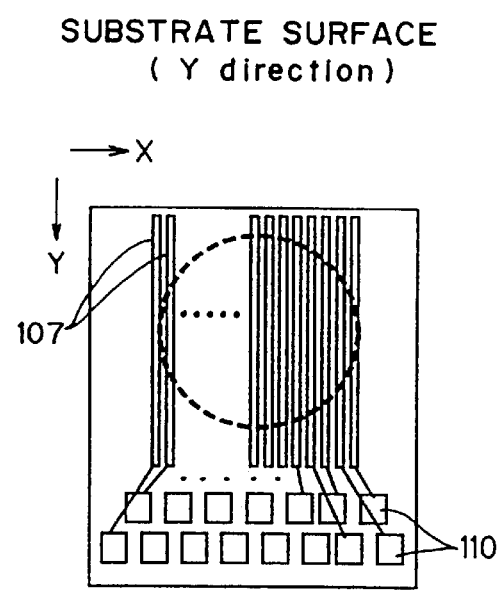

FIG. 4 is a sectional view showing portions of the liquid crystal device and the objective lens in the optical storage device shown in FIG. 3. FIG. 5 is a perspective view showing portions of the liquid crystal device and the objective lens in the optical storage device shown in FIG. 3. FIGS. 6(A) and 6(B) are views showing electrode structures of the liquid crystal device.

The objective lens 15 comprises a plano-convex lens 151 disposed at a position coming very close to the protective layer 100a, and an aspherical lens 152 disposed behind the plano-convex lens 151. It is possible to constitute the objective lens 15 with a piece of lens. However, it is difficult to implement a high NA. For this reason, according to the present embodiment, a high NA of objective lens is constructed through a combination of the plano-convex lens 151 and the aspherical lens 152 as shown in FIG. 4. The objective lens 15 is controlled in movement in such a manner that a movement as to a direction parallel to a surface of the optical disk, for example, a direction perpendicular to a sheet face of FIG. 4, is controlled in accordance with the tracking error signal derived from the photo detector 22 for a tracking error detection as shown in FIG. 3, and a movement as to a direction approaching or separating from the optical disk, that is, a vertical direction of FIG. 4, is controlled in accordance with the focus error signal derived from the photo detector 24 for a focus error detection.

The liquid crystal device 10 is disposed behind the objective lens 15.

The liquid crystal device 10 has, as shown in FIG. 4, a structure that a first liquid crystal layer 102 is sandwiched between a glass substrate 101 and a glass substrate 103, and a second liquid crystal layer 104 is sandwiched between a glass substrate 103 and a glass substrate 105. As shown in FIG. 6(A), the first liquid crystal layer 102 is sandwiched between a plurality of transparent first electrodes 106 each extending in an X-direction and arranged in a Y-direction and a transparent solid electrode (not illustrated) extending to the whole surface. As shown in FIG. 6(B), the second liquid crystal layer 104 is sandwiched between a plurality of transparent second electrodes 107 each extending in a Y-direction and arranged in an X-direction and a transparent solid electrode (not illustrated) extending to the whole surface. To manufacture the liquid crystal device 10, the respective electrode is formed on a surface of the associated glass substrate, and then the associated alignment film for determining an alignment for a liquid crystal is formed on the electrode thus formed. The respective liquid crystal layer is formed in a state that it is sandwiched between the alignment films. As shown in FIGS. 6(A) and 6(B), the first electrodes 106 for driving the first liquid crystal layer and the second electrodes 107 for driving the second liquid crystal layer are extended in a direction perpendicularly intersecting to one another and are arranged in a direction perpendicularly intersecting to one another. Incidentally, the circles depicted by a broken line, as shown in FIGS. 6(A) and 6(B), denote the passages of light beams.

The plurality of first electrodes 106 shown in FIG. 6(A) are connected via the associated pads 108 and the associated lead wires 109 shown in FIG. 5 to a drive circuit 50. Likely, the plurality of second electrodes 107 shown in FIG. 6(B) are connected via the associated pads 110 and the associated lead wires 111 shown in FIG. 5 to the drive circuit 50. The drive circuit 50 applies controlled voltages between the plurality of first electrodes 106 of the liquid crystal device 10 and the solid electrode, and between the plurality of second electrodes 107 of the liquid crystal device 10 and the solid electrode, so that an aberration of light beams condensed on the optical disk is corrected. According to the present embodiment (FIG. 3), when the optical disk 100 is loaded onto the optical storage device according to the present embodiment, a control voltage necessary for a suitable aberration correction is applied to the liquid crystal device 10 to monitor a focus error signal derived from the photo detector 24. At that time, a voltage to be applied to the liquid crystal device 10 is varied so that an applying voltage to the liquid crystal device 10, with which an appropriate focus error signal is obtained, is given in the form of a necessary aberration correction amount. Thus, it is possible to know a varying amount of the protective layer 100a on a surface of the optical disk 100.

When the optical disk 100 is actually accessed, the drive circuit 50 drives the liquid crystal device 10 to correct a spherical aberration in accordance with a detected thickness. Incidentally, according to the present embodiment, an unevenness (an unevenness inside an individual) in thickness of the protective layer inside the single optical disk is neglected, since it is very small as compared with an unevenness as an individual difference.

Figure 7:
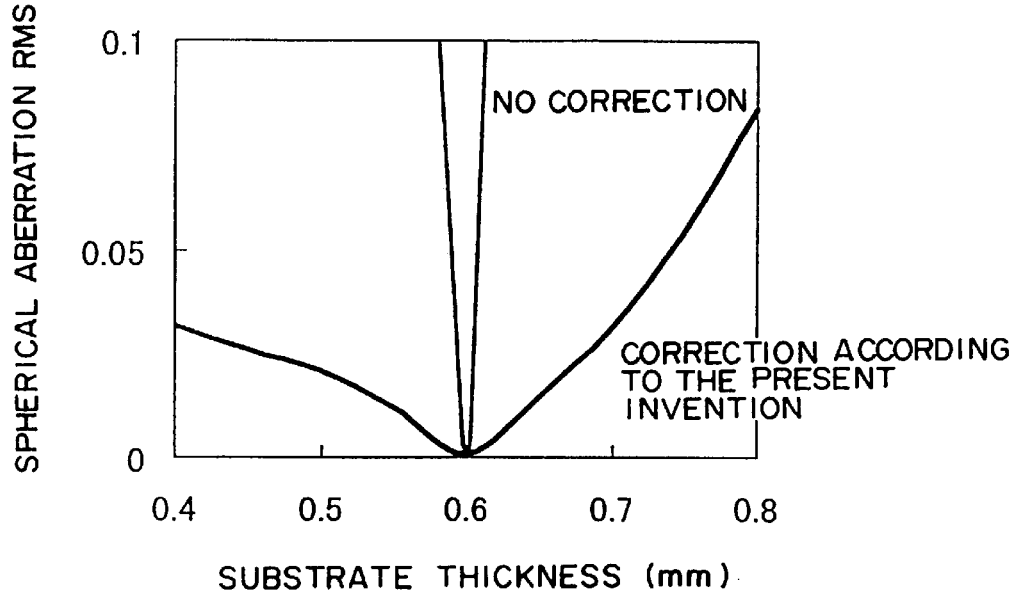
FIG. 7 is a graph showing an effect of correction of a spherical aberration by a liquid crystal device.

FIG. 7 is a graph showing an effect of correction of a spherical aberration by the liquid crystal device 10 wherein as the objective lens 15 shown in FIG. 4, an objective lens adopting parameters of Table 1 set forth below is constructed.

FIG. 7 shows a residual spherical aberration wherein a protective layer on a surface of an optical disk is varied actually in thickness, assuming that the reference thickness of the protective layer is 0.6 mm, and the objective lens is designed, manufactured and disposed so as to bring about no spherical aberration when the reference thickness of the protective layer is 0.6 mm.

TABLE 1

| Wavelength | 685 nm |
|---|---|
| NA (numerical aperture) | 0.85 |
| Aspherical lens | |
| Curvature radius | 3.0 mm |
| | (aspheric surface) |
| Thickness | 2.6 mm |
| Refractive index | 1.511 |
| Plano-convex lens | |
| Curvature radius | 1.25 mm |
| Thickness | 1.4 mm |
| Refractive index | 1.513 |
| Focal length | 4.0 mm |

Here, as shown in FIGS. 6(A) and 6(B), the first electrodes 106 and the second electrodes 107 are arranged as a stripe. Distributions of the first and second liquid crystal layers 102 and 104 offer a step-like shaped one on each arrangement pitch of the first electrodes 106 and the second electrodes 107. However, according to this simulation, the phase distributions of light by the first and second liquid crystal layers 102 and 104 constituting the liquid crystal device are given in form of continuous amount, but not such a step-like shaped one.

Further, here, the first and second liquid crystal layers 102 and 104 are different in a position of an optical axis direction. Thus, instead of the above-mentioned equations (3) and (4), the following equations (5) and (6) are adopted.

$$\phi(x) = c_1 \cdot x^2 + c_2 \cdot x^4 + c_3 \cdot x^6 + c_4 \cdot x^8 + c_5 \cdot x^{10} \quad (5)$$

$$\phi(y) = c_6 \cdot y^2 + c_7 \cdot y^4 + c_8 \cdot y^6 + c_9 \cdot y^8 + c_{10} \cdot y^{10} \quad (6)$$

According to the present embodiment, the first electrodes 106 and the second electrodes 107, which are arranged as a stripe as shown in FIGS. 6(A) and 6(B), are adopted, and thus light beams passing through the liquid crystal device are subjected to a phase distribution correction independent on a primary dimensional basis with respect to an X-direction and a Y-direction. Nevertheless in the event that the phase distribution correction as to the X-direction and the phase distribution correction as to the Y-direction are synthesized, a phase, which is reversed from the spherical aberration, is formed, so that the spherical aberration is corrected.

The residual aberration distribution after correction offers a result that an RMS value is reduced under a balance of the vertical and horizontal directions (X-direction and Y-direction) and the oblique direction. The RMS value is sufficiently small, as shown in FIG. 7, as compared with an allowance (0.07λ), even if the thickness of the protective layer varies ±50 μm (±0.05 mm) or so. Thus, this involves no problem with respect to an imaging performance of a condensing spot.

Figure 8:
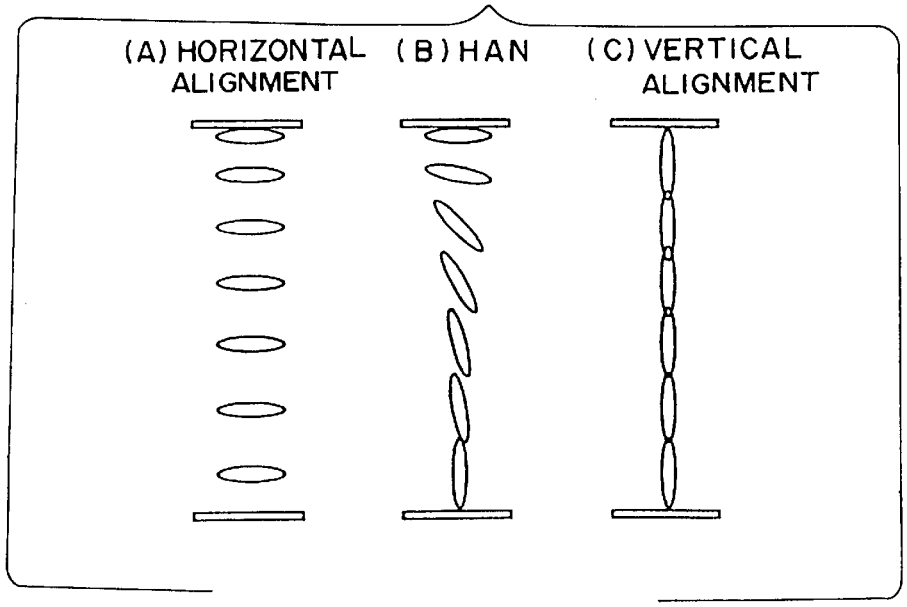
FIG. 8 is a typical illustration showing an initial alignment of liquid crystal molecules.

FIG. 8 is a typical illustration showing an initial alignment of liquid crystal molecules.

As the initial alignment of liquid crystal molecules, there are a horizontal alignment (part (A)), HAN (part (B)) and a vertical alignment (part (C)). It is acceptable that any one of those alignments is adopted. It is noted that since it is necessary that a polarization state of a laser beam is not varied by a liquid crystal per se, there is a need that a varying face of an alignment of liquid crystal molecules by an electric field is identical to a polarization direction of a laser beam passing through the liquid crystal layer.

Figure 9:
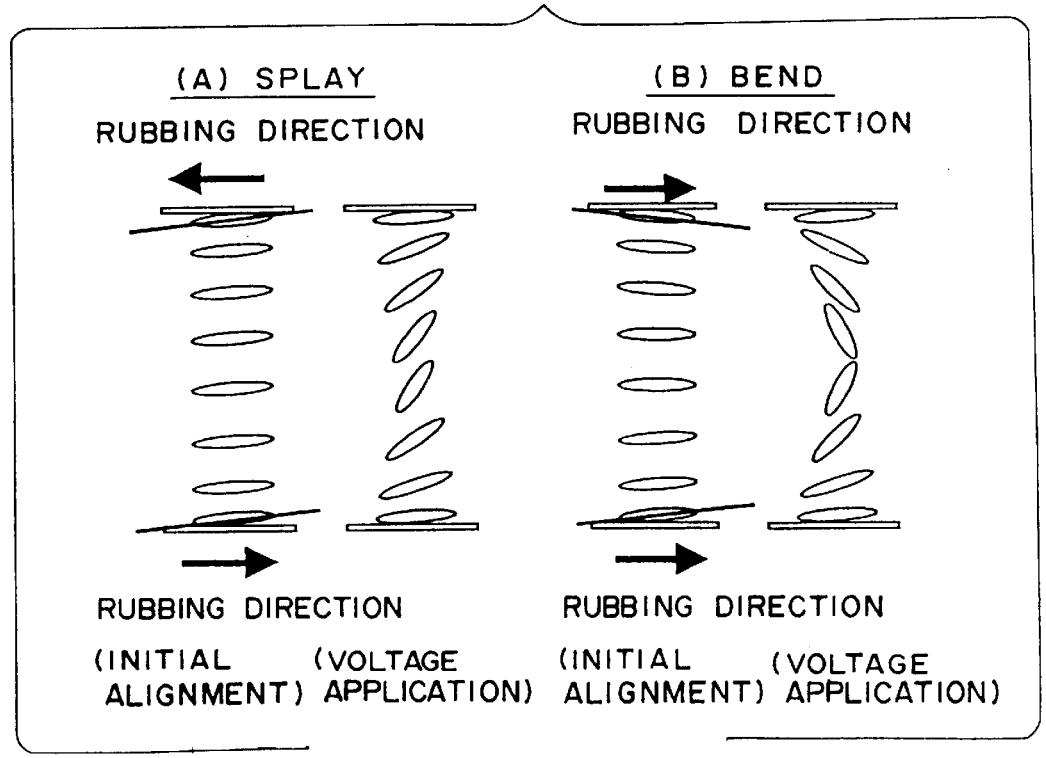
FIG. 9 is a typical illustration showing alignment characteristics of liquid crystal molecules by an electric field.

FIG. 9 is a typical illustration showing alignment characteristics of liquid crystal molecules by an electric field.

The alignment characteristic of liquid crystal molecules by an electric field is classified, as shown in FIG. 9, into a splay type and a bend type. In the event that an alignment processing involving a mechanical rubbing, which is referred to as "rubbing" in a manufacturing process of a liquid crystal device, is applied, the splay type is defined by rubbing upper and lower substrates sandwiching a liquid crystal layer in mutually different directions, and the bend type is defined by rubbing in the same direction. In the event that a change of liquid crystal molecules in alignment makes the same phase alteration on light beams passing through the liquid crystal layer, the bend alignment offers higher response as compared with the splay alignment. Therefore, according to the present embodiment, the bend alignment is adopted for both the first liquid crystal layer and the second liquid crystal layer, and thereby contributing to higher operating speed.

Figure 10:
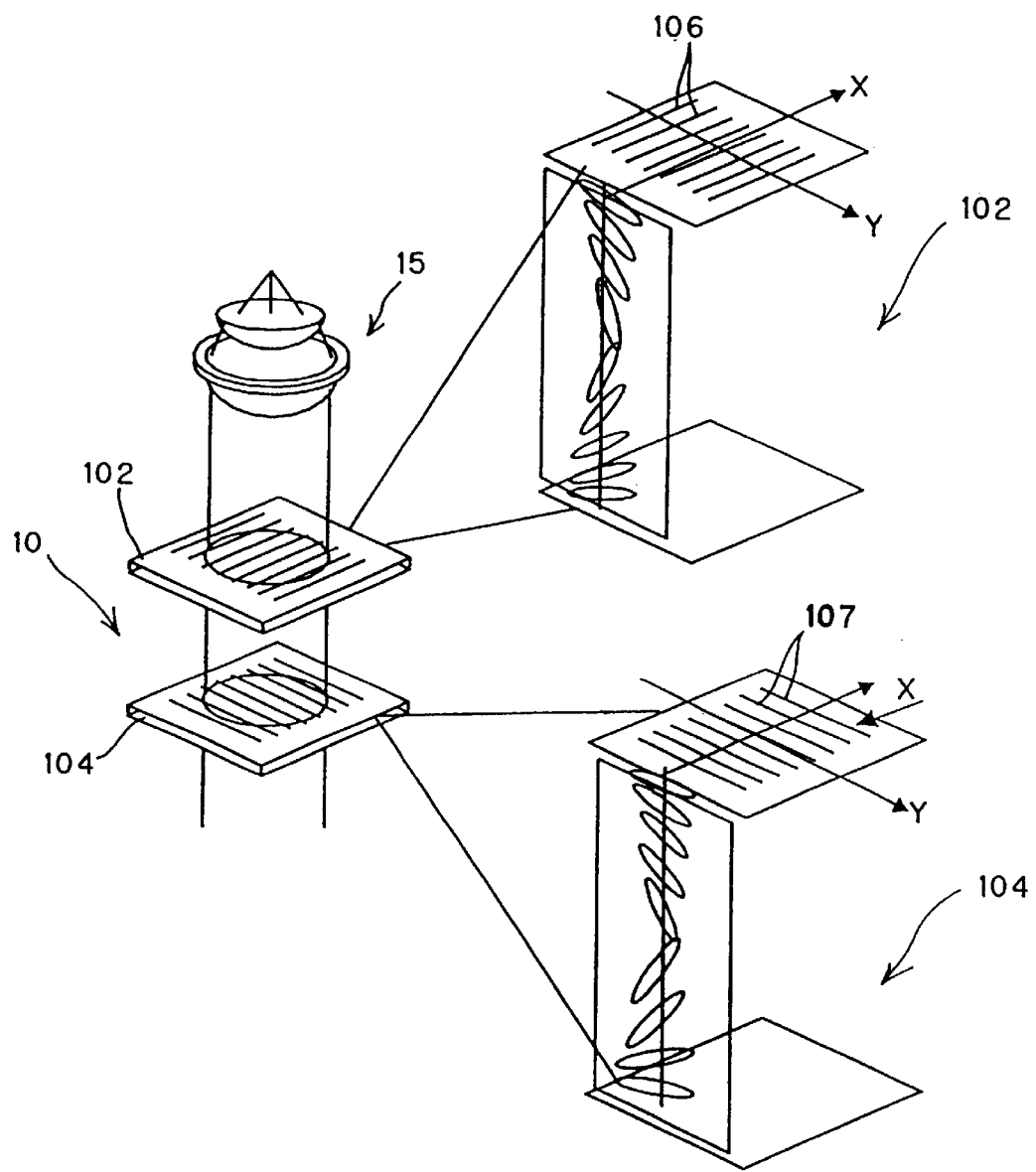
FIG. 10 is an illustration showing a relationship between an electrode structure of a liquid crystal device and an alignment surface of liquid crystal molecules in a liquid crystal layer.

FIG. 10 is an illustration showing a relation between an electrode structure of a liquid crystal device and an alignment surface of liquid crystal molecules in a liquid crystal layer.

Now it is assumed that a longitudinal direction (Y-direction) of the second electrodes 107 for driving one (here the second liquid crystal layer 104) of the first and second liquid crystal layers 102 and 104 constituting the liquid crystal device 10 is identical to the polarization direction of the laser beams passing through the liquid crystal layer, and a longitudinal direction (X-direction) of the first electrodes 106 for driving another (here the first liquid crystal layer 102) perpendicularly intersects to the polarization direction of the laser beams passing through the liquid crystal layer. Further, it is assumed that an alignment surface of liquid crystal molecules is the same direction (Y-direction) between the first and second liquid crystal layers 102 and 104, and is the same direction as the polarization surface of the laser beams. This arrangement makes it possible to prevent the polarization direction of the laser beams from being disturbed by the liquid crystal device.

Figure 11:
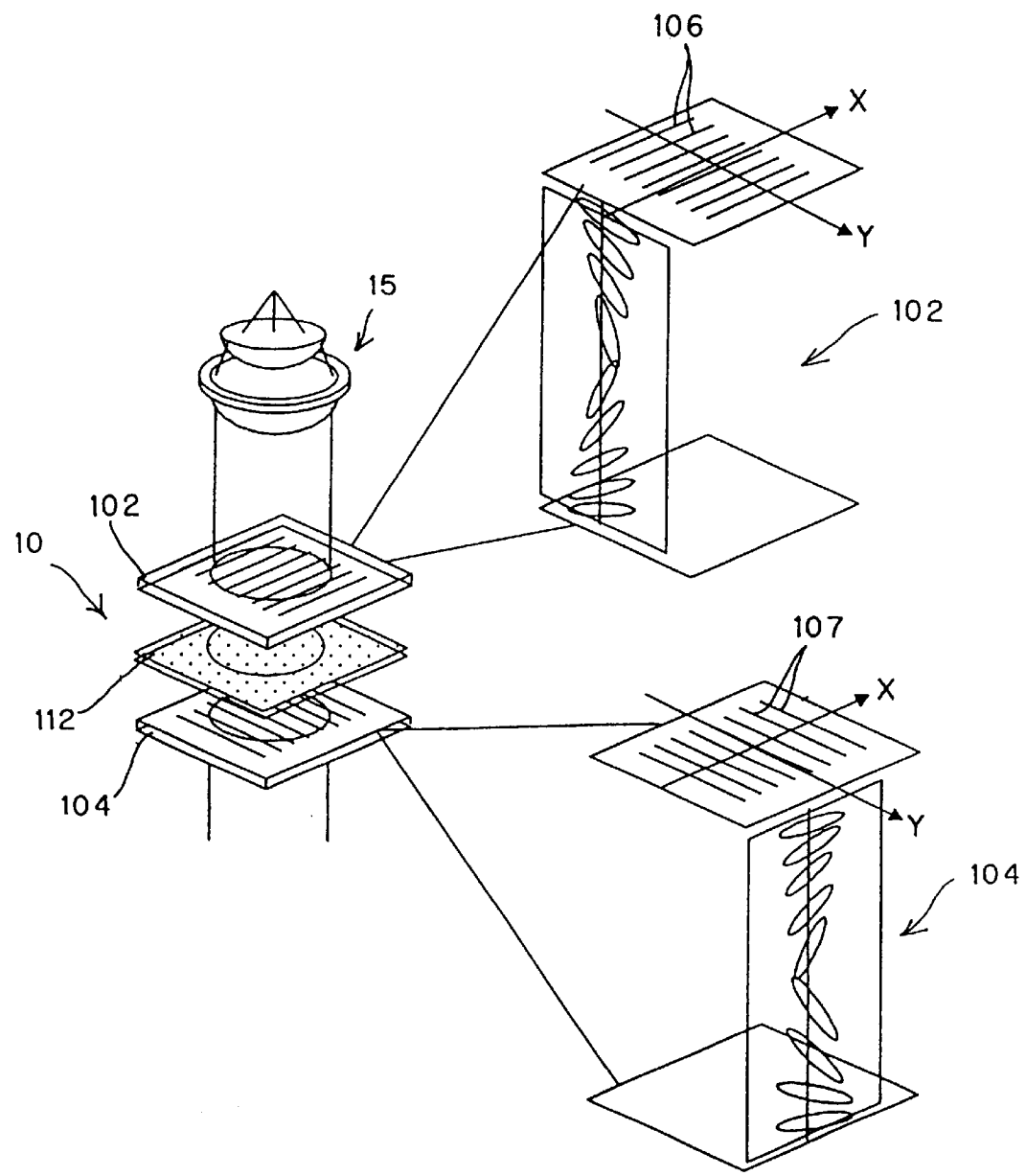
FIG. 11 is an illustration showing an alternative relationship between an electrode structure of a liquid crystal device and an alignment surface of liquid crystal molecules in a liquid crystal layer.

FIG. 11 is an illustration showing an alternative relation between an electrode structure of a liquid crystal device and an alignment surface of liquid crystal molecules in a liquid crystal layer.

According to the embodiment shown in FIG. 11, an alignment surface of liquid crystal molecules in the first liquid crystal layer 102 is the alignment direction (Y-direction) of the first electrodes 106, and an alignment surface of liquid crystal molecules in the second liquid crystal layer 104 is the alignment direction (X-direction) of the second electrodes 107. This means, if it is maintained, that the polarization surface of the laser beams and the alignment surface of liquid crystal molecules would intersect on either the first liquid crystal layer 102 or the second liquid crystal layer 104, but not coincide, even if the polarization surface of the laser beams is directed to either the X-direction or the Y-direction. For this reason, according to the present embodiment, there is disposed a $\lambda/2$ plate 112 between the first liquid crystal layer 102 and the second liquid crystal layer 104. The $\lambda/2$ plate 112 serves to rotate the alignment surface of the laser beams passing therethrough by 90°. Thus, if the polarization surface of light being applied from under FIG. 11 to the liquid crystal device 10 is set to be coincident with the alignment surface of liquid crystal molecules of the second liquid crystal layer 104, the laser beams passed through the second liquid crystal layer 104 rotates by 90° at the $\lambda/2$ plate 112, so that the polarization surface of the laser beams is coincident with the alignment surface of liquid crystal molecules of the first liquid crystal layer 102, and whereby the laser beams pass through the first liquid crystal layer 102. Consequently, also in the embodiment shown in FIG. 11, the polarization surface of the laser beams and the alignment surface of liquid crystal molecules in both the first liquid crystal layer 102 and the second liquid crystal layer 104 coincide, and thus it is possible to prevent the polarization of the laser beams from being disturbed by the liquid crystal device 10.

Figure 12:
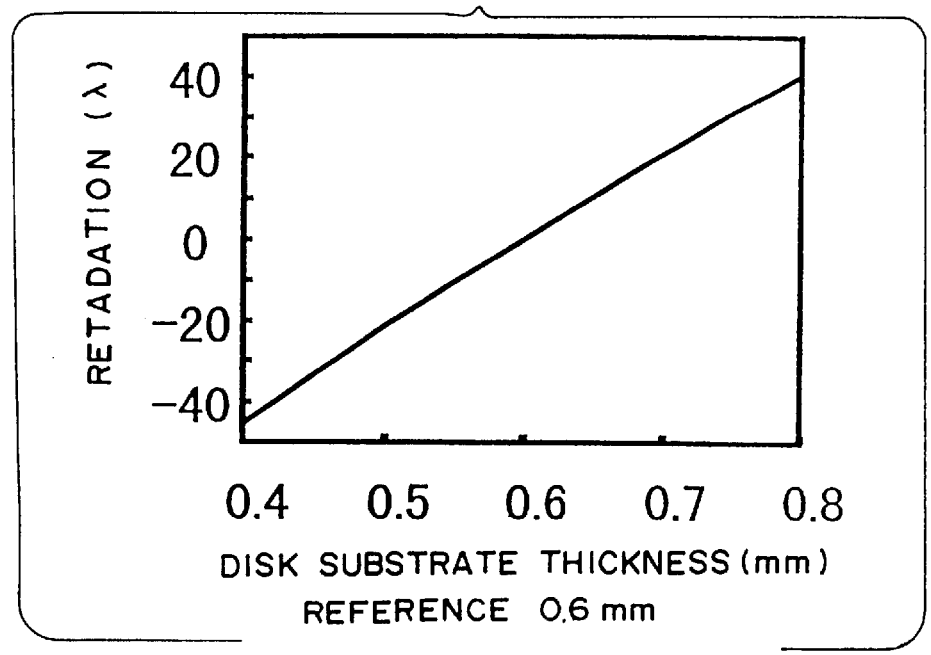
FIG. 12 is a graph showing a maximum phase control amount necessary for correction of a spherical aberration in a liquid crystal device.

FIG. 12 is a graph showing a maximum phase control amount necessary for correction of a spherical aberration in a liquid crystal device, wherein a reference thickness of a protective layer of an optical disk substrate is 0.6 mm, a thickness of the protective layer is varied between 0.4 mm and 0.8 mm.

As shown in FIG. 12, the retadation, where a reference thickness of a protective layer of an optical disk substrate is varied ±0.2 mm (0.4 mm~0.8 mm ), is about ±40 $\lambda$. Even in case of ±50 $\mu$m (±0.05 mm) which is considered as an unevenness in thickness of the protective layer on each individual of the optical disk, it is about ±10 $\lambda$. When it is intended to faithfully control ±10 $\lambda$, there is a need to prepare a thick liquid crystal layer. The use of a thick liquid crystal layer brings about decreasing the response speed and also increasing a cost. For this reason, according to the present embodiment, a phase distribution within a beam plane of laser beams is controlled to be a phase distribution of a Kinoform structure which will be described hereinafter.

Figure 13:
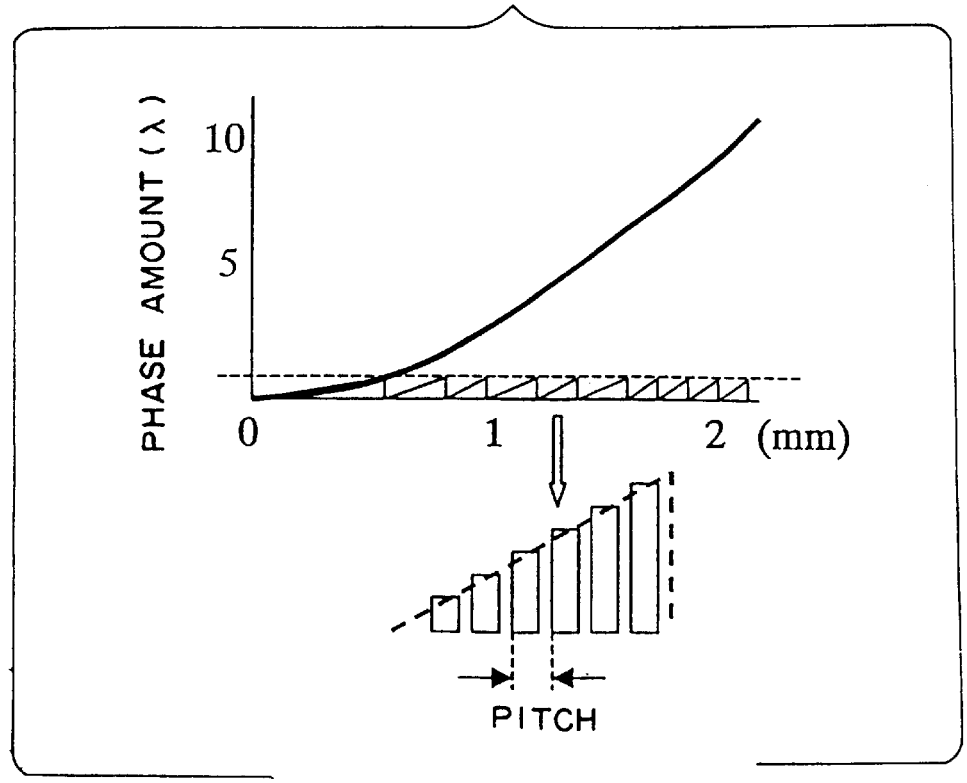
FIG. 13 is an explanatory view useful for understanding a Kinoform structure.

FIG. 13 is an explanatory view useful for understanding a Kinoform structure.

The Kinoform structure is a phase structure using a principle of a fresnel lens wherein a phase is replaced by a phase 0 every phase $2\pi$. Adoption of the Kinoform structure makes it possible to vary a phase of laser beams between 0 and $2\pi$ by means of forming a liquid crystal layer of 8 $\mu$m or so in thickness in the event that a liquid crystal material of $\Delta n=0.15$ is used where $\Delta n$ denotes a difference in refractive index between a case where a voltage is applied to electrodes and a case where no voltage is applied to electrodes. In the event that a phase gradation between 0 and $2\pi$ is set up to 8 levels, a pitch of stripe-like shaped electrodes is given with fineness of 12 $\mu$m to 13 $\mu$m or so.

A voltage to be applied to the electrodes thus formed is determined by a spherical aberration (or a thickness of a protective layer on an optical disk surface) to be corrected. Specifically, applying voltages to the respective electrodes are determined in accordance with the above-mentioned equations (5) and (6) wherein coefficients $c_1 \sim c_{10}$, which are determined in accordance with the spherical aberration (or a thickness of a protective layer on an optical disk surface) to be corrected, are substituted for the equations (5) and (6), and in addition a varying characteristic of a refractive index of a liquid crystal layer to an applying voltage, which is determined by properties of a liquid crystal used in the liquid crystal layer.

Figure 14:
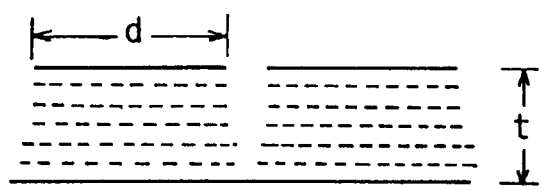
FIGS. 14(A) and 14(B) are views showing a relation between a thickness t of a liquid crystal layer and a width d of a stripe-like shaped electrode.
Figure 14:
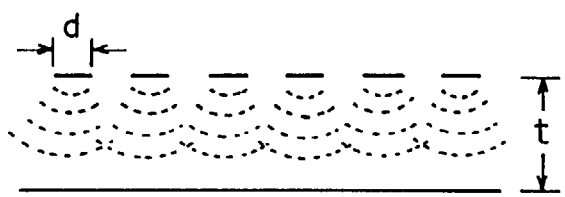

FIGS. 14(A) and 14(B) are views showing a relation between a thickness t of a liquid crystal layer and a width d of a stripe-like shaped electrode.

FIG. 14(A) shows a case where a width d of the electrode to which a voltage for driving the liquid crystal layer is applied is larger than a thickness t of the liquid crystal layer. In this case, an electric field, which is formed within the liquid crystal layer when a voltage is applied to the electrode, is formed substantially along the electrode, as shown with the broken lines in FIG. 14(A).

FIG. 14(B) shows a case where a width d of the electrode to which a voltage for driving the liquid crystal layer is applied is smaller than a thickness t of the liquid crystal layer.

In this case, an electric field, which is formed within the liquid crystal layer when a voltage is applied to the electrode, is expanded more than a width d of the electrode to which the voltage is applied, and thus there is a possibility that an expected electric field cannot be formed within the liquid crystal layer.

Thus, there is a limit in narrowing the pitch of the electrodes to strictly meet the equations (5) and (6), and therefore it is preferable that the liquid crystal device is formed in such a manner that a width d of the electrode is larger than a thickness t of the liquid crystal layer.

Figure 15:
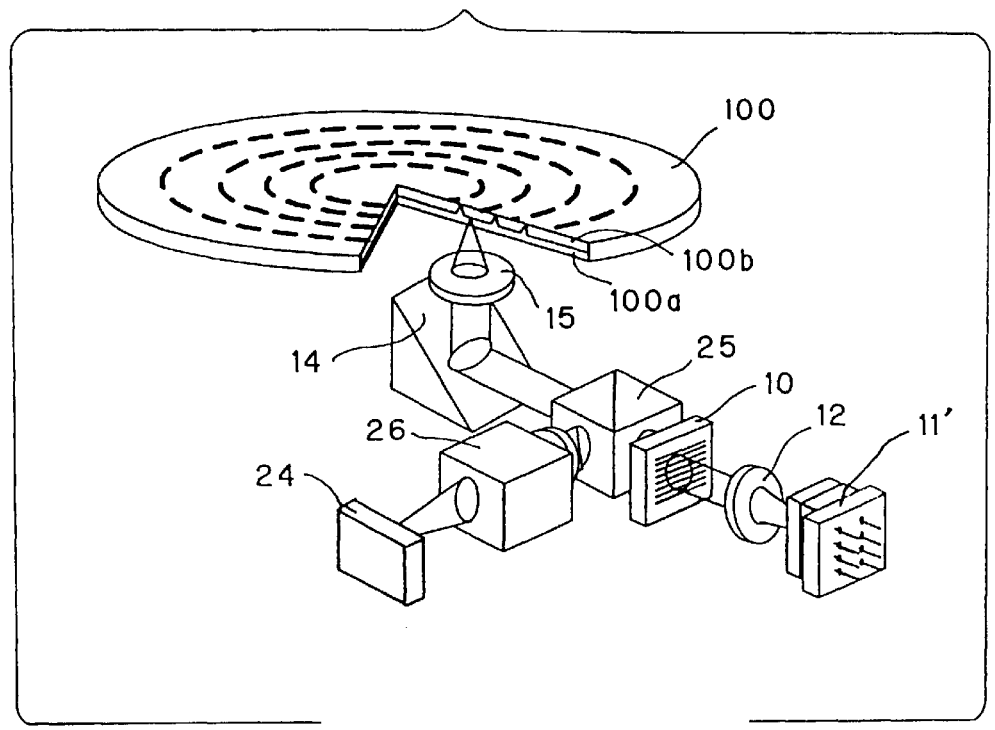
FIG. 15 is a schematic construction view of an optical storage device according to the second embodiment of the present invention.

FIG. 15 is a schematic construction view of an optical storage device according to the second embodiment of the present invention.

A laser beam emitted from a semiconductor laser-servo detection system united body type of device 11' passes through the condenser lens 12 and the liquid crystal device 10, and enters a beam splitter 25. The laser beam arrived at the beam splitter 25 passes through the beam splitter 25, and reflects on the mirror 14, and further passes through the objective lens 15, and goes toward the optical disk 100. Light beams emitted from the objective lens 15 are condensed on a point on the recording layer 100b placed below the protective layer 100a of the optical disk 100. A signal light reflected on the recording layer 100b of the optical disk 100, which carries information recorded on the optical disk 100, passes through the objective lens 15, reflects on the mirror 14, enters the beam splitter 25. An incident light to the beam splitter 25 is divided into two parts one of which is a signal light going to the united body type of device 11', and another a signal light going to the photo detector 24 for reading information recorded on the optical disk 100. The signal light directed to the united body type of device 11' passes through the liquid crystal device 10 and the condenser lens 12, and enters the united body type of device 11'. The united body type of device 11' generates a tracking error signal and a focus error signal in accordance with the incident light, so that the objective lens 15 is driven in accordance with those error signals.

On the other hand, the signal light outgoing to the photo detector 24 side enters the photo detector 24 via Wollaston prism 26. The photo detector 24 reads information recorded on the optical disk 100.

According to the present embodiment, the liquid crystal device 10 is disposed at a portion (specifically, between the condenser lens 12 and the beam splitter 25) other than a portion for a common use with a pick-up optical system for introducing the signal light reflected on the optical disk 100 to the photo detector 24 for information reading, of an illumination optical system up to a process of outgoing of laser beams emitted from the united body type of device 11' from the objective lens 15. Light beams emitted from the united body type of device 11' are condensed via the liquid crystal device 10 on the optical disk 100. The signal light carrying information stored in the optical disk 100 is lead to the photo detector 24 without passing through the liquid crystal device 10.

In the event that an optical magnetic disk is adopted as the optical disk 100, it is necessary for the optical storage device to detect a rotatory polarization of Kerr effect due to magnetism. Thus, in the event that the liquid crystal device has an affect on a detection of Kerr effect, it is preferable that the liquid crystal device is disposed at a position that the signal light reflected on the optical disk 100 does not pass through the liquid crystal device again, as shown in FIG. 15. On the other hand, in the event that the liquid crystal device has no affect on the signal light reflected on the optical disk 100, it is acceptable that the liquid crystal device is disposed at the position as shown in FIG. 3. In this case, it is preferable that the liquid crystal device 10 and the objective lens 15 are formed in a unitary body.

Figure 16:
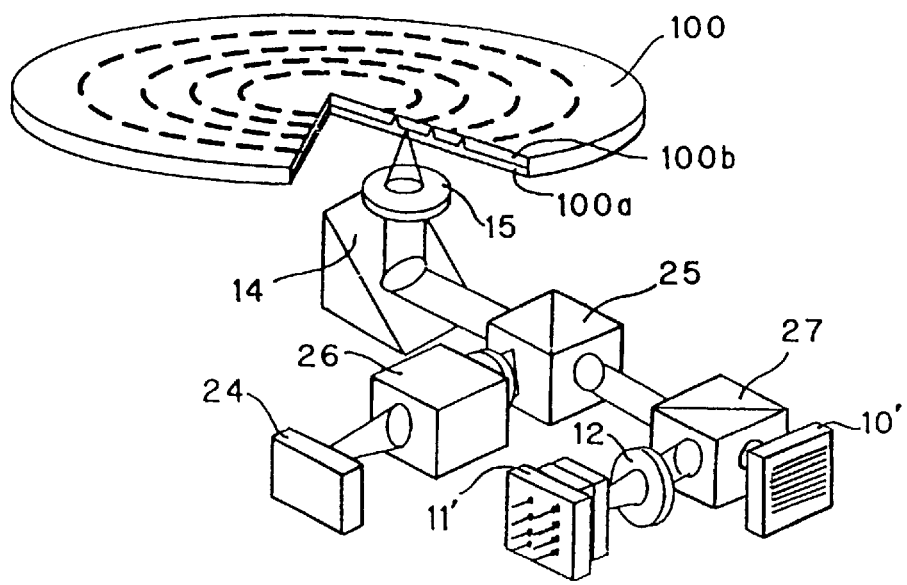
FIG. 16 is a schematic construction view of an optical storage device according to the third embodiment of the present invention.

FIG. 16 is a schematic construction view of an optical storage device according to the third embodiment of the present invention.

A laser beam emitted from the semiconductor laser-servo detection system united body type of device 11' passes through the condenser lens 12, and enters a beam splitter 27, and then goes to a liquid crystal device 10'.

Figure 17:
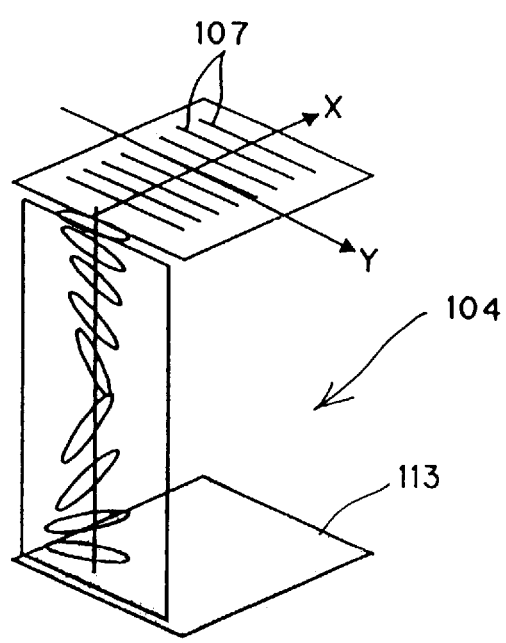
FIG. 17 is a partially typical illustration of the second liquid crystal layer side of the liquid crystal device shown in FIG. 16.

FIG. 17 is a partially typical illustration of the second liquid crystal layer side of the liquid crystal device 10' shown in FIG. 16.

A laser beam emitted from the beam splitter 27 shown in FIG. 16 to the liquid crystal device 10' side enters the liquid crystal device 10' in a direction directed from above to below, passes through a first liquid crystal layer (cf. FIG. 10) not illustrated in FIG. 17, and then passes through the second liquid crystal layer 104 illustrated in FIG. 17. At the bottom of the second liquid crystal layer 104, there is formed an aluminized film as an electrode. The aluminized film serves as not only a solid electrode 113 but also a reflecting mirror. A laser beam passed through the second crystal layer 104 and reached the solid electrode 113 reflects on the solid electrode 113, again passes through the second liquid crystal layer 104, again passes through the first liquid crystal layer not illustrated, and goes out from a surface of the liquid crystal device 10', which surface is the same as an incident surface of the liquid crystal device 10' which the laser beam is applied to. In this manner, according to the liquid crystal device 10' of the present embodiment, the laser beam passes through the first liquid crystal layer and the second liquid crystal layer twice, respectively. Consequently, it is sufficient for the first liquid crystal layer and the second liquid crystal layer to have a thickness which permits a phase of the laser beam for one passage to vary between 0 and $\pi$. Thus, according to the present embodiment, as compared with the embodiments shown in FIGS. 3 and 15, it is possible to reduce a thickness of the liquid crystal layer to one-half of the previous thickness and have a higher operating speed.

In the third embodiment shown in FIG. 16, a laser beam emitted from the liquid crystal device 10' passes through the beam splitter 27 and another beam splitter 25, and reflects on the mirror 14, and further passes through the objective lens 15, and goes toward the optical disk 100. Light beams emitted from the objective lens 15 are condensed on the recording layer 100b placed below the protective layer 100a. The signal light reflected on the recording layer 100b passes through the objective lens 15, reflects on the mirror 14, and enters the beam splitter 25. The signal light entered the beam splitter 25 is split into two parts of a signal light directed toward the united body type of device 11' and a signal light directed toward the photo detector 24 for reading information recorded on the optical disk 100. The signal light directed to the united body type of device 11' passes through the beam splitter 27 to reciprocate the liquid crystal device 10' by one turn, reflects on the beam splitter 27, and enters the united body type of device 11'. The united body type of device 11' generates a tracking error signal and a focus error signal in accordance with the incident light, so that the objective lens 15 is driven in accordance with those error signals.

On the other hand, the signal light outgoing to the photo detector 24 side enters the photo detector 24 via Wollaston prism 26. The photo detector 24 reads information recorded on the optical disk 100.

Figure 18:
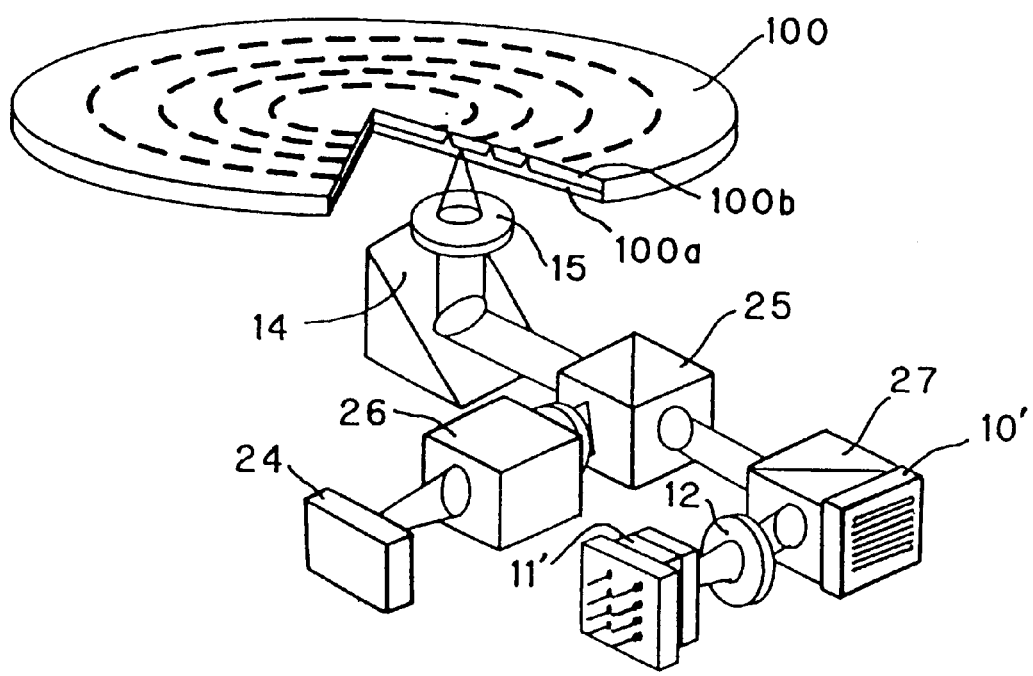
FIG. 18 is a schematic construction view of an optical storage device according to the fourth embodiment of the present invention.

FIG. 18 is a schematic construction view of an optical storage device according to the fourth embodiment of the present invention. Only different points from the third embodiment shown in FIG. 16 will be described.

According to the embodiment shown in FIG. 18, the beam splitter 27 and the liquid crystal device 10' are formed in a unitary body. This arrangement makes it possible to reduce the number of parts and contribute to miniaturization. Other contractual portions of the embodiment shown in FIG. 18 are the same as the third embodiment shown in FIG. 16, and thus a redundant description will be omitted.

Forming the beam splitter and the liquid crystal device in a unitary body is applicable also to the embodiment shown in FIG. 15. In case of the embodiment shown in FIG. 15, the beam splitter 25 and the liquid crystal device 10 are formed in a unitary body.

Figure 19:
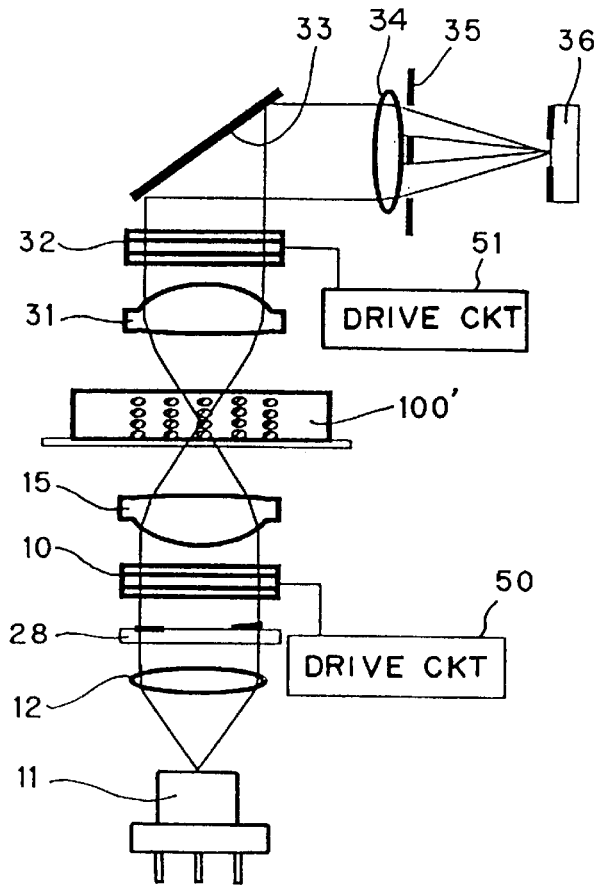
FIG. 19 is a schematic construction view of an optical storage device according to the fifth embodiment of the present invention.

FIG. 19 is a schematic construction view of an optical storage device according to the fifth embodiment of the present invention.

This embodiment relates to a scheme of picking up transmitted light of an optical storage medium 100'.

A laser beam emitted from the semiconductor laser 11 passes through the condenser lens 12, a phase plate 28, the liquid crystal device 10 and an objective lens 15, and enters the optical storage medium 100'. The optical storage medium 100' has a plurality of information storage points in a depth direction (a vertical direction of FIG. 19). In this case, the spherical aberration is varied in accordance with a depth position of an information storage point for information to be written or read out. For this reason, according to the present embodiment, a driving circuit 50 for driving the liquid crystal device 10 drives the liquid crystal device 10, taking into consideration a position of an access point in a depth direction, in such a manner that the spherical aberration (a convergence side spherical aberration) becomes always minimum.

Light beams transmitted through the optical storage medium 100' pass through a condenser lens 31 and an additional liquid crystal device 32, reflect on a reflecting mirror 33, further pass through a lens 34 and a zone plate 35, and enter a pin-hole type of photo detector 36, so that information stored in the optical storage medium 100' is read in accordance with the same principle as a phase-contrast microscope.

The liquid crystal device 32, which is provided in a pick-up optical system side for leading the signal light transmitted through the optical storage medium 100' to the photo detector 36, has the same structure as the liquid crystal device 10 provided on the irradiation optical system side for applying laser beams to the optical storage medium 100'. A driving circuit 51, of which a structure is the same as the driving circuit 50 for driving the liquid crystal device 10 provided on the irradiation optical system side, drives the liquid crystal device 32 to correct the divergent side spherical aberration according to a depth looking from the condenser lens 31 side, on the condensing point in the optical storage medium 100'.

In this manner, the optical storage device of the present invention is applicable also to a transmission detection type of optical storage medium, and a multi-layer type of optical storage medium as well.

Figure 20:
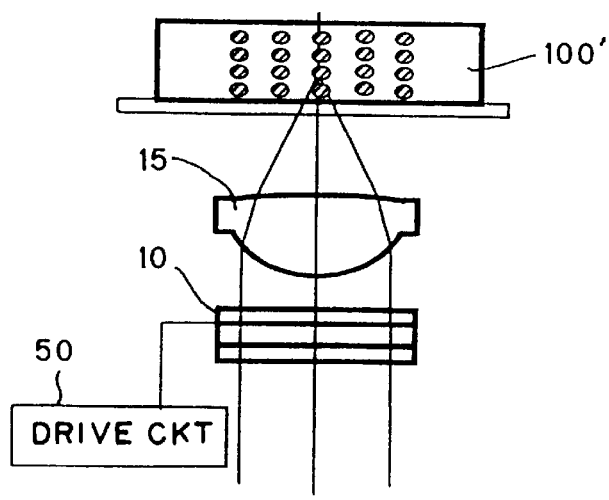
FIG. 20 is a schematic construction view of an optical storage device according to the sixth embodiment of the present invention.

FIG. 20 is a schematic construction view of an optical storage device according to the sixth embodiment of the present invention.

The optical storage device shown in FIG. 20 is provided with an irradiation optical system for applying a condensing spot to a recording point of the multi-layer type of optical storage medium 100' also shown in FIG. 19, but no pick-up optical system for reading information recorded on the optical storage medium 100'.

In this manner, the optical storage device of the present invention can also be constructed as a writing-dedicated device.

According to the present embodiments as mentioned above, there have been explained all the optical storage device for accessing an optical disk. However, the present invention is not restricted to a disk type of optical storage medium, and it is acceptable that an optical storage device of the present invention is constructed as an optical storage device for accessing another type of optical storage medium, for example, a tape-like shaped medium. Further, it is sufficient for the optical storage device of the present invention to access using light, and regardless of principles of information recording and reading, the optical storage device of the present invention is widely applicable to, for example, a phase change type of optical disk, an optical magnetic disk and the like.

As mentioned above, according to an optical storage medium of the present invention, it is possible to effectively correct an aberration owing to a variation in depth from a surface of an optical storage medium to a point for condensing, and thereby forming a small optical spot. Therefore, it is possible to contributing to a higher density of recording.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An optical storage device comprising:

a light source;

an irradiation optical system for leading light emitted from said light source to condense on a predetermined optical storage medium;

a photo detector for picking up a signal light carrying information stored in said optical storage medium to read the information, said signal light being condensed onto said optical storage medium and reflected on said optical storage medium;

a pick-up optical system for leading said signal light to said photo detector;

a liquid crystal device having first and second liquid crystal layers disposed in an optical path of said irradiation optical system and extending in parallel with a direction intersecting said optical path, a plurality of first electrodes for driving said first liquid crystal layer, said plurality of first electrodes extending in a predetermined x-direction intersecting said optical path and arranged in a y-direction intersecting both said optical path and said x-direction, and a plurality of second electrodes for driving said second liquid crystal layer, said plurality of second electrodes extending the y-direction and arranged in the x-direction;

a $\lambda/2$ plate between said first and second liquid crystal layers; and a liquid crystal driver for applying controlled voltages to said plurality of first electrodes and said plurality of second electrodes of said liquid crystal device to correct an aberration of light to be condensed on said optical storage medium;

wherein said irradiation optical system is an optical system which permits light beams emitted from said light source to pass through said liquid crystal device on a reciprocation basis while the light beams are condensed on said optical storage medium, and said first and second liquid crystal layers of said liquid crystal device have a thickness such that phases of light emitted from said light source passing through said first and second liquid crystal layers one time vary between 0 and $\pi$ under control of voltages applied to said first electrodes and said second electrodes, respectively.

2. An optical storage device according to claim 1, wherein a part of said irradiation optical system is shared with a part of said pick-up optical system, said liquid crystal device is disposed at a portion other than a portion for common use of said irradiation optical system and said pick-up optical system, light beams emitted from said light source are condensed via said liquid crystal device onto said optical storage medium, and the signal light carrying information stored in said optical storage medium, which is condensed onto said optical storage medium and reflected on said optical storage medium, is led via an optical path, which is different from an optical path passing through said liquid crystal device, to said photo detector.

3. An optical storage device comprising:

a light source;

an irradiation optical system for leading light emitted from said light source to condense on a predetermined optical storage medium;

a liquid crystal device having first and second liquid crystal layers disposed in an optical path of said irradiation optical system and extending in parallel with a direction intersecting said optical path, a plurality of first electrodes for driving said first liquid crystal layer, said plurality of first electrodes extending in a predetermined x-direction intersecting said optical path and arranged in a y-direction intersecting both said optical path and said x-direction, and a plurality of second electrodes for driving said second liquid crystal layer, said plurality of second electrodes extending the y-direction and arranged in the x-direction;

a $\lambda/2$ plate between said first and second liquid crystal layers; and a liquid crystal driver for applying controlled voltages to said plurality of first electrodes and said plurality of second electrodes of said liquid crystal device to correct an aberration of light to be condensed on said optical storage medium;

wherein said irradiation optical system is an optical system which permits light beams emitted from said light source to pass through said liquid crystal device on a reciprocation basis while the light beams are condensed on said optical storage medium, and said first and second liquid crystal layers of said liquid crystal device have a thickness such that phases of light emitted from said light source passing through said first and second liquid crystal layers one time vary between 0 and $\pi$ under control of voltages applied to said first electrodes and said second electrodes, respectively.

4. An optical storage device according to claim 3, wherein said optical storage medium has a plurality of information storage points in a depth direction, and said liquid crystal driver applies voltages, which are controlled in accordance with condensing points in the depth direction of said optical storage medium, to the plurality of first electrodes and the plurality of second electrodes of said liquid crystal device, respectively, so that an aberration correction according to the condensing points in the depth direction of said optical storage medium is performed.

5. A liquid crystal device comprising:

first and second liquid crystal layers extending in a state that they are opposite to one another in parallel with a predetermined plane extending in an x-direction and a y-direction which intersect each other;

a plurality of first electrodes for driving said first liquid crystal layer, said plurality of first electrodes extending in the x-direction and arranged in the y-direction;

a plurality of second electrodes for driving said second liquid crystal layer, said plurality of second electrodes extending in the y-direction and arranged in the x-direction; and a $\lambda/2$ plate between said first and second liquid crystal layers;

wherein said irradiation optical system is an optical system which permits light beams emitted from said light source to pass through said liquid crystal device on a reciprocation basis while the light beams are condensed on said optical storage medium, and said first and second liquid crystal layers of said liquid crystal device have a thickness such that phases of light emitted from said light source passing through said first and second liquid crystal layers one time vary between 0 and $\pi$ under control of voltages applied to said first electrodes and said second electrodes, respectively.

* * * * *